United States Patent [19]

Born

[11] 4,353,016
[45] Oct. 5, 1982

[54] LINEAR MOTOR CONTROL SYSTEM FOR BRUSHLESS DC MOTOR

[75] Inventor: Vernon A. Born, Minneapolis, Minn.

[73] Assignee: Minnesota Mining and Manufacturing Company, St. Paul, Minn.

[21] Appl. No.: 256,383

[22] Filed: Apr. 22, 1981

[51] Int. Cl.³ .......................................... H02K 29/02
[52] U.S. Cl. ..................... 318/254; 318/138; 318/439
[58] Field of Search ................ 318/254, 254 A, 138

[56] References Cited

U.S. PATENT DOCUMENTS

| | | | |
|---|---|---|---|
| 3,144,574 | 8/1964 | Henry-Baudot | 310/268 |
| 3,706,923 | 12/1974 | Dunfield | 318/254 |
| 3,839,661 | 10/1974 | Wada | 318/254 A |
| 3,896,357 | 7/1975 | Tanikoshi | 318/254 A |
| 4,119,895 | 10/1978 | Muller | 318/138 |
| 4,228,384 | 10/1980 | Arnold et al. | 318/254 |

OTHER PUBLICATIONS

Dana F. Geiger, "Notes on PMI Brushless Motor Development", 4/11/78.

Primary Examiner—J. V. Truhe
Assistant Examiner—S. M. Bergmann
Attorney, Agent, or Firm—Cruzan Alexander; Donald M. Sell; William B. Barte

[57] ABSTRACT

A linear motor control system for a brushless DC motor is disclosed wherein a plurality of rotor position sensors are provided together with a means for selecting a first or second group of those sensors, thus enabling alternate sets of position signals to be selected depending upon motor speed. These respective sensor signals are then processed through a filter network to provide sinusoidal motor drive signals which continuously modulate motor winding currents to provide linear speed control, thereby resulting in an appreciable decrease in acoustical noise produced by the motor.

6 Claims, 6 Drawing Figures

LINEAR MOTOR CONTROL SYSTEM FOR BRUSHLESS DC MOTOR

BACKGROUND OF THE INVENTION

The present invention generally relates to brushless DC motors and to systems for controlling the energizing thereof, i.e. electronic commutator systems, such as are often utilized in disc drives for magnetic disc computer memory drives of the "Winchester" type.

A wide variety of brushless D.C. Motors is known in the art. In general, such devices employ a permanently magnetized rotor, such as constructed of a plurality of discrete permanent magnets or of an annular ring alternately magnetized to provide a plurality of poles, and a plurality of stator windings secured to the motor frame. The permanent magnets thus rotate with the rotor, and in lieu of brushes, electronic commutation is employed to switch current to the appropriate windings as the rotor rotates, to follow the magnetic poles, thus causing continued rotation. Such commutation systems thus include some form of non-contacting means for sensing the angular displacement of the rotor, i.e., optical or magnetic sensors. Current is then switched to appropriate stator windings in response to the sensors to cause rotation of the motor. The motor speed and uniformity thereof is ordinarily controlled and/or influenced by the sensor outputs and by supply voltage changes and load fluctuations.

Brushless DC motors of the printed circuit type, such as depicted in U.S. Pat. No. 4,228,384 are often utilized in disc drives. However, in signal reproducing apparatus employing disc drives, it is important to minimize ripple torque, i.e. to minimize surge currents required by the disc drive as well as to minimize the cost of the components utilized. Such disc drive systems typically require substantial surge currents while starting from standstill and lesser, but still substantial, surge currents during steady running, because of the widespread use of so-called "bang-bang" or "drive-coast" speed control systems. The bang-bang speed control system has a speed variation which is poorer than that obtained with a continuous speed control system.

Bang-bang speed control systems draw bursts of the full surge current in between "coasting" periods. This results in a speed which oscillates continuously up and down over a range of typically ±0.5%. Furthermore, as the power supply is continually subjected to surge currents even while the motor is running at nominal speed, these surge currents cause transient voltages in the power supply distribution system which in turn can have a deleterious effect on other disc drives, tape drives, etc., which typically operate on the same power distribution system.

In order to reduce the need for such surge currents, it is known to provide dual feed-back loops such that one loop enables on-off speed control during start-up, and a second loop provides continuous speed control while operating at or near the desired motor speed. U.S. Pat. No. 3,706,923 depicts one system for minimizing speed variations utilizing such a dual loop feedback concept. In the system there set forth, a closed-loop feedback servo circuit is enabled during the time that the motor is accelerating to its desired speed, after which speed control is obtained in an open-loop mode solely under control of a precise clock source so as to automatically vary the load angle or phase difference between the rotor pole centerline and the rotating electromagnetic field.

Another dual loop feedback system is disclosed in U.S. patent application Ser. No. 197,185, filed Oct. 15, 1980 (Lewis), which application is assigned to the same assignee as the present application. In the system there set forth, current to energize selected motor windings, as selected by an electronic commutator circuit, is controlled by a switching circuit operable in a first closed-loop to provide a pulse width on-off modulation control during initial start-up, and operable in a second closed-loop to provide for continuous substantially linear speed control during operation at or near a nominal operating speed. While such a linear speed control is said to enable accurate speed control, while reducing the amount of electrical noise and minimizing power supply surges, it does so through the use of an extensive, complicated and necessarily expensive circuit in which power switching transistors continue to be used to switch current to the respective windings at the appropriate times dictated by the rotor position sensors.

SUMMARY OF THE INVENTION

In contrast to the commutation drive and electronic commutation circuits set forth in the above noted Lewis application wherein the driver amplifiers are still "hard" driven in response to square wave excitation pulses originating with the rotor position sensors, the motor control system of the present invention utilizes a modified linear speed control loop to proportionately modulate signals controlling driver amplifiers for each of the respective windings per se, rather than being utilized to control a current switching circuit which in turn feeds on-off switched drive circuits.

The motor control system of the present invention is thus adapted to control a brushless direct current motor of the type having a rotor having a plurality of permanent magnet poles at equal angular locations about the axis thereof, the angular spacing therebetween being 360 degrees/N, where N is the number of poles, and a stator having at least three windings for providing at least three fields per pole. The system may be considered as comprising the following components, a rotor position sensing means including at least four sensors, a multiplex means for selecting the outputs of certain groups of three sensors, filter means including at least three filter sections for providing substantially sinusoidal motor control signals, driver amplifier means including at least three amplifier sections for amplifying each of the motor control signals, and negative feedback means for controlling the intensity of the motor control signals to maintain the current supplied to the windings at a relatively constant level. The means for sensing the rotor position relative to the stator includes a multisector marking means such as a code wheel secured to the rotor for identifying each pole and at least four sensors, as previously noted, positioned proximate to the marking means for detecting the sectors thereof. The sensors are angularly spaced from each other to provide at least three sequential signals indicative of the incremental passage of a pole through an angular segment corresponding to the angular spacing, each sensor providing a square wave output signal, each transition of which denotes the passage of one pole past that sensor.

The multiplexer means alternately selects and passes therethrough output signals from a first or second group of the sensors, the first group including a succession of at least three equally angularly spaced sensors, and the second group including a similar succession of at least three equally angularly spaced sensors including the two sensors of said first group immediately preceding the first to the second group of sensors, square wave output signals indicative of a set of incremental positions of the rotor advanced in time over that provided by said first group may be processed to offset subsequent electrical time delays.

The filter means, as noted above, includes at least three independent filter sections, each filter section being coupled to process signals corresponding to a given sensor output passed through the multiplexer means, and having a limited upper frequency cutoff to provide, in response thereto, time delayed motor control signals having an essentially sinusoidal waveform.

The driver amplifier means likewise includes at least three linear amplifiers, each of which is coupled to one of the filter sections for amplifying one of the motor control signals and is further coupled between a direct current power source and a selected winding, for sequentially energizing the windings to provide a succession of fields corresponding to the incremental passage of a pole through said angular segment.

Finally, the negative feedback means includes at least three separate feedback loops between each of the linear amplifiers and an associated filter section for responding to the current supplied to each of said windings to thereby control the intensity of each of said motor control signals such as to maintain said supplied current at a relatively constant level.

As may thus be recognized, in contrast to the system described in Lewis, in the system of the present invention the driver circuits are no longer "hard" driven between on and off states. Rather, the sinusoidal motor control signals controlling the linear amplifiers provide continuous proportional control over the motor speed in response to any detected difference between the desired motor speed and the actual motor speed. By eliminating the hard switching circuits previously utilized in electronic commutation, improved control over motor speed is effected, incremental speed variations are reduced, and, of major importance to the application of such motors in many environments, electrical and acoustic noise is markedly reduced. Such acoustic noise is particularly of concern where brushless DC motors of the printed circuit type are employed in computer memory disc drives which typically operate continuously. In such instances, even relatively low level low frequency whine is objected to by users subjected to such conditions over long periods of time.

In further preferred embodiments, the motor control system of the present invention includes oscillator means such as a crystal controlled oscillator circuit for establishing a motor speed reference signal having a predetermined pulse rate corresponding to a desired motor speed, frequency and phase detector means responsive to the predetermined pulse rate and to the transition rate of a selected output signal from one of the sensors to provide a speed and phase error signal indicative of the difference between the actual motor speed and phase and the desired motor speed and phase and means responsive to the error signal for modifying the signals passed through the multiplex means to said filter means, thus increasing or decreasing the motor speed to minimize the error signal.

BRIEF DESCRIPTION OF THE DRAWING

The foregoing advantages, construction, and operation of the present invention will become more readily apparent from the following description and the accompanying drawings in which.

DESCRIPTION OF THE PREFERRED EMBODIMENTS

The basic concept of electronic commutation of brushless DC motors is well known in the art. Thus, for example, it is well recognized that in such a motor, some means must be provided for instantaneously sensing the rotor position and for utilizing a signal obtained from such sensors to control the energization of specific windings of the stator such that a rotating electromagnetic field is provided in synchronization with the rotation of the magnetic poles of the rotor. Consistent with such a general understanding, it may be seen in FIG. 1 that the motor control system of the present invention 10 is adapted for use with a brushless DC motor comprising a motor stator 12 having at least three windings 14, 16 and 18 adapted for three-phase operation and, for example, may be connected in a "Y" configuration. The motor also includes a multi-sector code wheel (not shown) secured to the rotor, and having as many optically detectable transitions as there are magnetic poles. Such motor components may, for example, be similar to type U9 printed circuit motor components manufactured by PMI Motors, Div. of Kollmorgen Corp. Syosset, N.Y. A plurality of rotor position sensors 20, which in the present invention includes at least four, preferably optoelectronic, sensors 22, 24, 26 and 28 are provided for detecting the transitions in the code wheel. The use of such a group of four sensors may be contrasted with that in prior art systems, such as that disclosed in U.S. Pat. No. 4,228,384, wherein the number of sensors selected for use in a given motor configuration equals the number of windings provided within an angular sector over which one magnetic pole of the rotor extends. In the present invention, the sensors 22 through 28 are coupled to a multiplexer 30, which is essentially a multipole switch, enabling the outputs of a first or second group of three sensors to be selected, depending upon the rotor speed. Thus, for example, the outputs of a first group of sensors, for example sensors 22, 24 and 26 may be selected during start-up operations during which the rotor speed is relatively low, and a second group of three sensors, i.e. sensors 24, 26 and 28 selected when the rotor speed is at or near the nominal motor operating speed.

Figure 1:
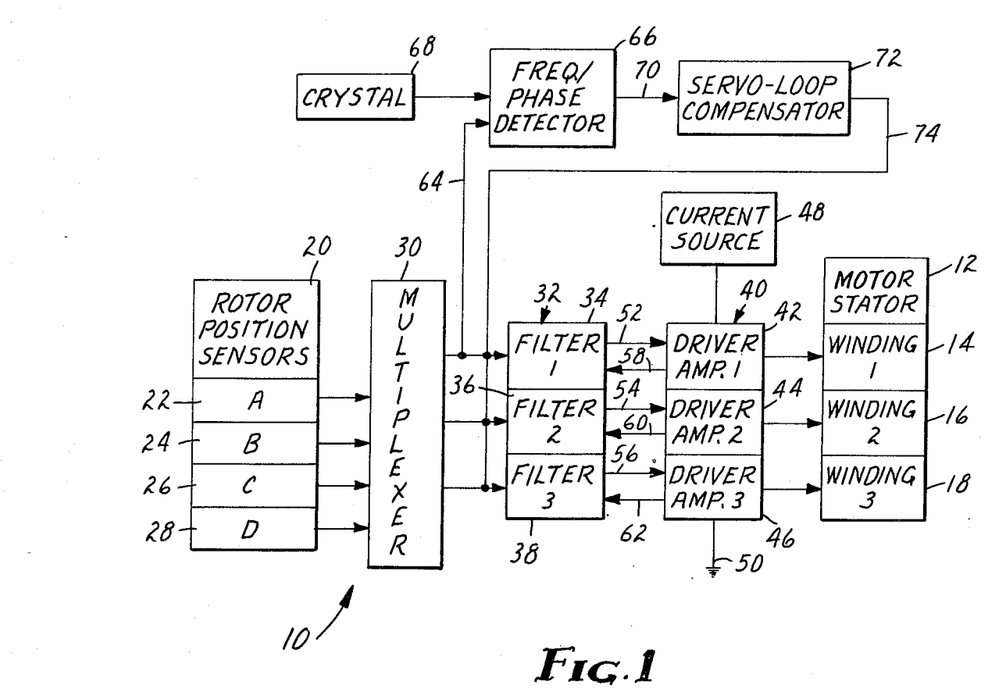
FIG. 1 is a block diagram of one embodiment of the motor control system of the present invention.

The outputs of each of these selected sensors are then passed from the multiplexer 30 to a filter assembly 32 which comprises three filter sections 34, 36, and 38. Each of the respective filter sections are desirably identical, and may be constructed of conventional two-pole low-pass filter circuits, having a high frequency cut-off at approximately 200 Hz. The inputs from these selected sensors, typically square waves having transitions which correspond to the instants at which the transition points of the code wheel forming a portion of the rotor passes a given sensor, are thus converted into substantially sinusoidal output signals. As filter circuits inherently also delay the output signal in time, the need for the second group of sensors as selected through the multiplexer thus becomes apparent. Namely, that at start-up conditions, when the rotor speed is relatively low, the frequency of the square wave signals produced by the sensors is sufficiently less than the cut-off frequency of the filters 34, 36, and 38, such that the signals pass through the filters substantially undelayed in time. In contrast, as the rotor approaches the nominal desired operating speed, the action of the filters 34 through 38 on the square wave signals from the first group of sensors results in the desired sinusoidal waveform, but delayed in time, with the result that when the correspondingly delayed drive signals are applied to the windings, the torques produced are insufficient to bring the rotor up to the desired speed. Accordingly, the second group of sensors 24, 26 and 28 are advanced in relative angular position with respect to the first group of sensors 20, 22 and 24 so as to provide square wave signals advanced in time with respect to the magnet pole positions. When those signals are processed through the filter sections 34 through 38, the sinusoidal signals are appropriately delayed such that the ultimate drive signals applied to the windings are in proper time relationship with the poles of the rotor, and maximum torque is achieved for minimum current input.

As further shown in FIG. 1, the sinusoidal signals produced by the filter sections 34 through 38 are coupled to a power amplifier 40 which, like the filter assembly 32, contains three substantially identical amplifier sections 42, 44, and 46. Each of the amplifier sections is coupled between a source of current 48 and a ground connection 50. In response to the sinusoidal motor control signals applied on leads 52, 54, and 56 respectively, each amplifier section controls the application of the current from current source 48 to the respective stator winding. Each of the amplifier sections 42, 44, and 46 is further provided with its own feedback loop, shown as leads 58, 60, and 62, which provides a signal to the appropriate filter section 34, 36 or 38, proportional to the current drawn by the respective winding section 14, 16, or 18. Such a feedback signal thus ensures that the amplitude of the motor control signals supplied by the filter sections to the power amplifiers results in the appropriate current levels applied to the windings to maintain the motor speed at the desired rate.

While the individual feedback loops between the power amplifier sections and the filter sections provide control over the current flow in each separate winding while at or near nominal operating speeds, a further feedback loop is provided for control of the actual operating speed. This loop includes an output taken from one of the sensors as passed through the multiplexer 30, such as shown at lead 64. The sensor output is coupled to a frequency and phase detector 66, which also receives an input from a crystal controlled oscillator 68. Such a detector is well known to those skilled in the art, and is, for example, depicted in U.S. Pat. No. 3,796,923, as well as in the Lewis patent application noted above. The detector 66 thus compares the frequency of pulses received from the crystal oscillator 68 with that received from the selected sensor on lead 64 and provides an error signal on lead 70, indicative of the difference therebetween. This signal is processed through a servo loop compensator circuit 72, and the thus compensated error signal is provided on lead 74 as an input to the respective filter sections 34, 36, and 38 together with the outputs from the selected sensors via the multiplexer 30.

Figure 2:
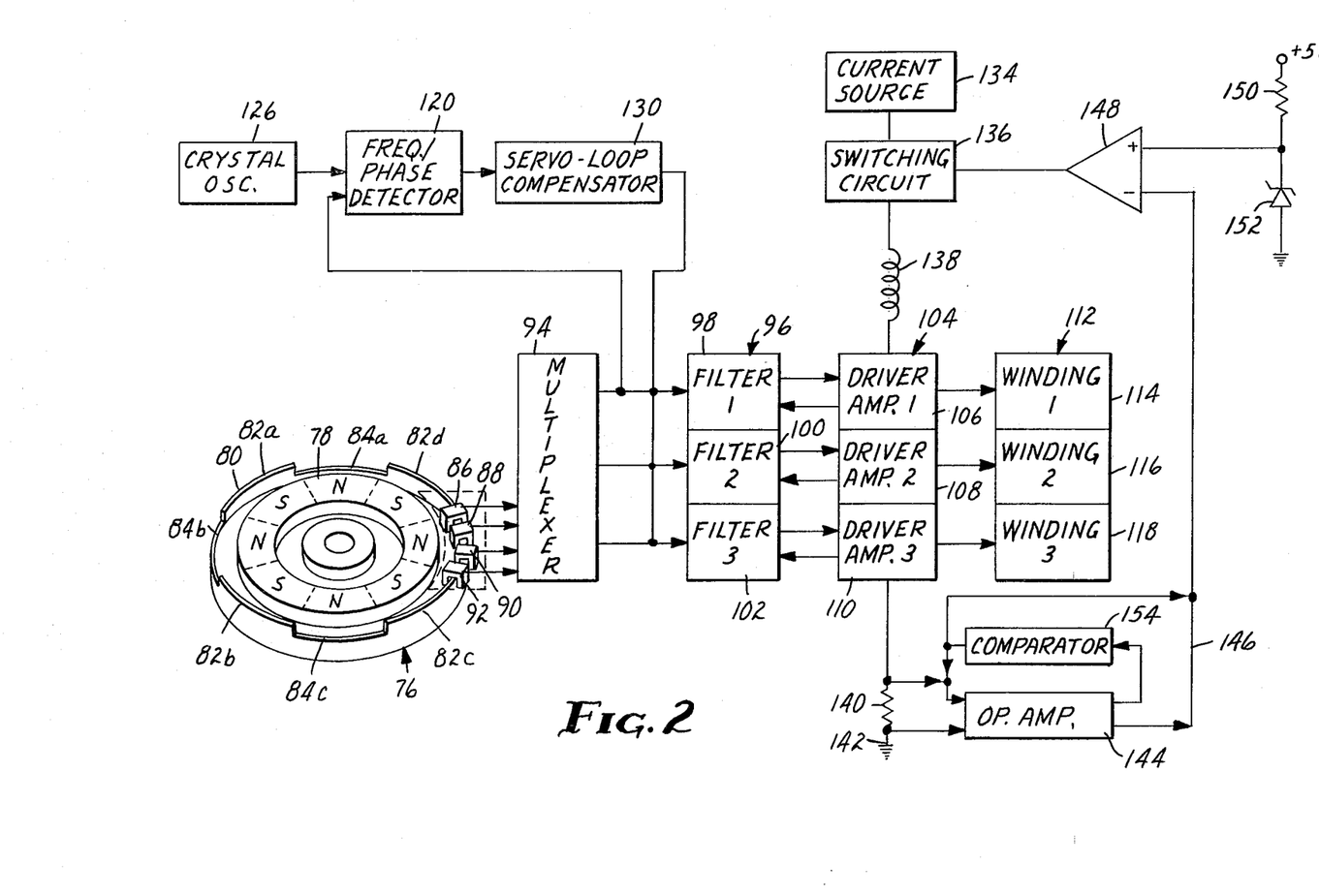
FIG. 2 is a block diagram of a further preferred embodiment of the motor control system of the present invention wherein a second feedback loop is provided.

A more detailed block diagram of a preferred embodiment of the present invention is set forth in FIG. 2. As may seen in that figure, the motor control system of the present invention is particularly adapted for use with a DC brushless motor having a rotor assembly 76. This assembly includes an annular ring of permanently magnetized material, with a plurality of magnetic poles 78, and concentrically positioned therearound a code wheel 80 having a plurality of castellated first portions 82a, 82b, 82c and, 82d alternating between second portions 84a, 84b, 84c, and 84d (not shown). The transitions between the portions 82 and the portions 84 thus correspond to the transitions between the respective magnetic poles 78. The four sensors 86, 88, 90, and 92 are positioned proximate to the code wheel 80 to detect the transitions between the portions 82 and 84. In a preferred embodiment, the sensors 86, 88, 90 and 92 each consist of a optoelectronic sensor such as may comprise a light emitting diode and a phototransistor, mounted on a common base and having a space therebetween such as to allow the code wheel 80 to pass therethrough.

As may be seen in FIG. 2, the sensors 86, 88, 90, and 92 are each mounted at 15 degree intervals such that three of the sensors encompass a 45 degree sector corresponding to one of the magnetic poles and similarly corresponding to the angular distance between the code wheel portions 82 and 84. The outputs from the sensors 86 through 92 are coupled to a multiplexer 94 and thence to the filter network 96 having sections 98, 100 and 102 and driver amplifier 104, comprising amplifier sections 106, 108 and 110 as set forth in FIG. 1. In further similar fashion to that set forth in FIG. 1, a feedback control circuit is provided which includes a frequency/phase detector 120, a crystal controlled oscillator 126, and the servo loop compensator network 130.

A portion of an open loop control system for controlling the speed of the motor during start-up operations is further shown in FIG. 2. A source of DC current is shown to be applied from current source 134, and to be coupled through a switching circuit 136, an inductor 138, which prevents instantaneous current changes in the windings of the motor and thence through the respective driver amplifiers 106, 108, and 110, to the respective windings 114, 116, and 118, and finally through a current sensing resistor 140 to a ground 142. The current flowing through the resistor 140 will, therefore, be indicative of the total amount of current flowing through the windings 114, 116, and 118. Since the resistance of the resistor is fixed, the voltage across the resistor will be indicative of the current flow. An operational amplifier 144 is coupled across the resistor 140 to provide at its output 146 a signal indicative of the current flow. This output is coupled to the input of comparator 148. The other input to the comparator 148 is held at a fixed DC voltage by means of the reference voltage network consisting of resistor 150 and Zener diode 152.

Accordingly, when the voltage provided on lead 146 exceeds that provided by the reference voltage network, the comparator 148 provides an output signal which activates the switching circuit 136 such as to interrupt current flow to the driver amplifiers. This results in the current through the sensing resistor 140 dropping to zero, which causes the subtractor 144 to have a zero output. This in turn results in the comparator 148 going high to activate the switching circuit 136 to once again supply current to the driver amplifiers 104. This switching action continues until the current sensed by resistor 140 falls to less than 3.5 amps. It may thus be recognized that in such a start-up mode, the current representing signal on lead 146 will control the switching circuit 136 and hence the current in the windings until an equilibrium is finally reached wherein the motor speed satisfies the dictates of the speed control loop formed by the crystal oscillator 126, the frequency/phase detector 120 and the servo loop compensator 130. The final control action is continuous and substantially linear.

An additional comparator 154 is provided to monitor the amount of current flowing through the resistor 140 such that when it reaches a predetermined threshold, the comparator 154 supplies positive feedback to the input of the operational amplifier 144 so as to switch output 146 to a high state to promote a rapid turnoff of the switching circuit 136. The comparator 154 operates to accelerate the changes in the sensing of the current flow through the windings of the motor and supplies that information to the comparator 148 which then tells the switching circuit 136 to go on or off in accordance with the current sensed by resistor 140. The inductor 138 also cooperates with the hysteresis created by the comparator 154 and with the characteristics of the windings 114, 116, and 118 and load to which the rotor is coupled to control the operating frequency of the on/off cycling of the switching circuit 136.

When the speed of the brushless motor is at or near its operating speed, the voltage present on lead 146 will drop below the reference level applied to the other input of the comparator 148. This will allow the comparator to send an appropriate signal to the switching circuit 136 such that subsequent linear speed control of the driver amplifiers is provided via the motor control signals supplied by the respective filter sections 98, 100, and 102. However, when the speed of the motor does not approximate its desired operating speed the voltage present on lead 146 as determined from the operational amplifier 144 will not exceed that threshold. In this case, the comparator 148 will send a different signal to the switching circuit 136, which then operates between its on and off states, alternately supplying or interrupting current flow to the driver amplifiers through the inductor 138, thus providing the motor with pulse width modulated control. When the speed of the motor begins to approximate its desired operating speed, the voltage present on lead 146 will drop below that predetermined threshold and the control system changes to the linear control.

It may thus be recognized that an improved dual feedback loop control system is provided wherein the motor is operated in a pulse width modulated control when the speed is not near the desired operating speed, such as at start-up, and is operated in a linear control mode when the speed is at or near its desired operating speed.

Figure 3:
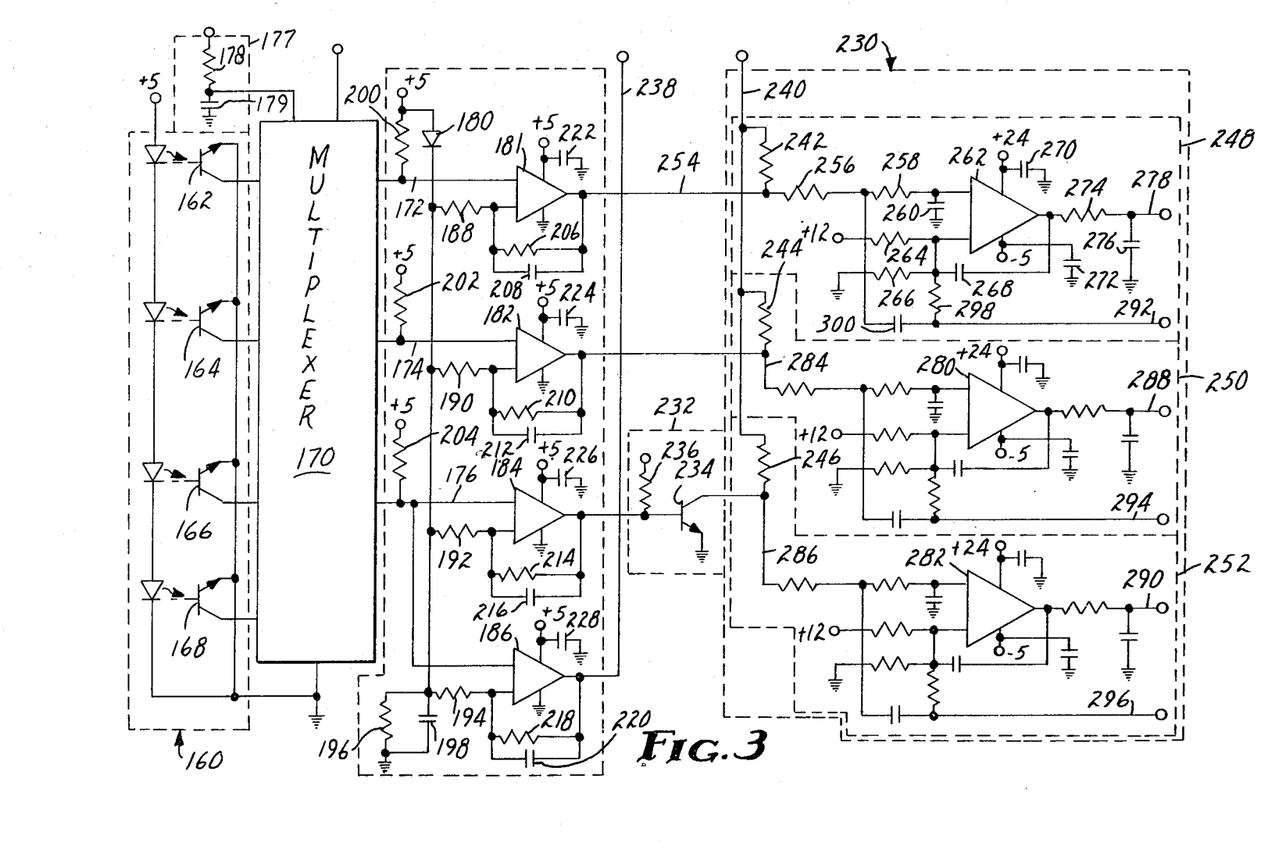
FIG. 3 is a schematic diagram showing the rotor position sensors, multiplexer, comparator, and filter sections of the present invention.

FIG. 3 is a schematic representation of the rotor position sensors 20, multiplexer 30 and filter network 32 such as set forth in FIGS. 1 and 2. In FIG. 3 it may be noted that the rotor position sensors 160 include a bank of four LED-phototransistor modules 162, 164, 166, and 168. the LED's of each module may be connected in series between a ground and a source of positive potential while the phototransistor outputs of each module are individually coupled to an integrated circuit multiplexer 170 connected as provided in the specification sheets for such devices to couple therethrough the outputs of three selected sensors at a given time. Thus, for example, a first group of sensors 162, 164, and 166 may be outputted on leads 172, 174 and 176 when the multiplexer is in a first state, and a second group of sensors 164, 166 and 168 outputted or leads 172, 174, and 176 when the multiplexer is in a second state. The switching of the multiplexer 170 between its respective two states is, as noted above, done to provide one set of outputs when the motor is in its start-up condition, and a second set of time-advanced outputs when it is at or near its nominal operating speed. Typically, the multiplexer may be switched about 5 seconds after initial power turn-on. The switching between states is conveniently done by means of 5 second RC timing circuit 177, which includes a resistor 178 and a capacitor 179.

In order to assure that the square wave pulses produced by the sensors occur at consistent times, it is desirable to provide a modified output when each sensor output exceeds a given threshold voltage. Accordingly, a three-volt reference potential is provided through diode 180 and that potential, together with the respective sensor outputs on leads 172, 174, and 176 are coupled to a bank of comparators formed of operational amplifiers 181, 182, 184, and 186, the three-volt reference potential being coupled to the operational amplifiers through biasing resistors 188, 190, 192, and 194. The reference potential is terminated through an RC network including resistor 196 and capacitor 198. The respective outputs from the multiplexer 170 are also coupled to a five-volt potential through pull-up resistors 200, 202 and 204. Each of the operational amplifiers 181, 182, 184, and 186 has associated therewith a positive feedback resistor-capacitor network including the resistor/capacitor combinations 206 and 208, 210 and 212, 214 and 216, and 218 and 220 together with the decoupling capacitors 222, 224, 226, and 228. These networks provide a small amount of hysteresis to enhance the switching action of the amplifiers.

The output of operational amplifiers 181 and 182 are fed directly to the filter network 230, while the output of operational amplifier 184 is coupled through an inverter stage 232 and the output therefrom coupled to the filter network 230. The need for the inversion of at least one of the signals produced by the sensors may be appreciated when one compares the phase relationship between the outputs of the respective sensors with that needed to successively energize the respective motor windings. Since each sensor is angularly positioned at a 15 degree offset with respect to the adjacent sensor, it will be readily appreciated that for one-third of each half cycle all three sensors will be either in an on or off state. If such signals are directly processed and coupled to energize the windings, the motor won't work. The sensor outputs have to be "decoded" to provide the three properly time related and sequenced waveforms. Inverting one of the three sensor outputs, such as by inverter 232, makes it possible to generate the required three phase voltages. The inverter 232 contains a single transistorized stage, including a transistor 234 and a biasing resistor 236.

Figures 4, 6:
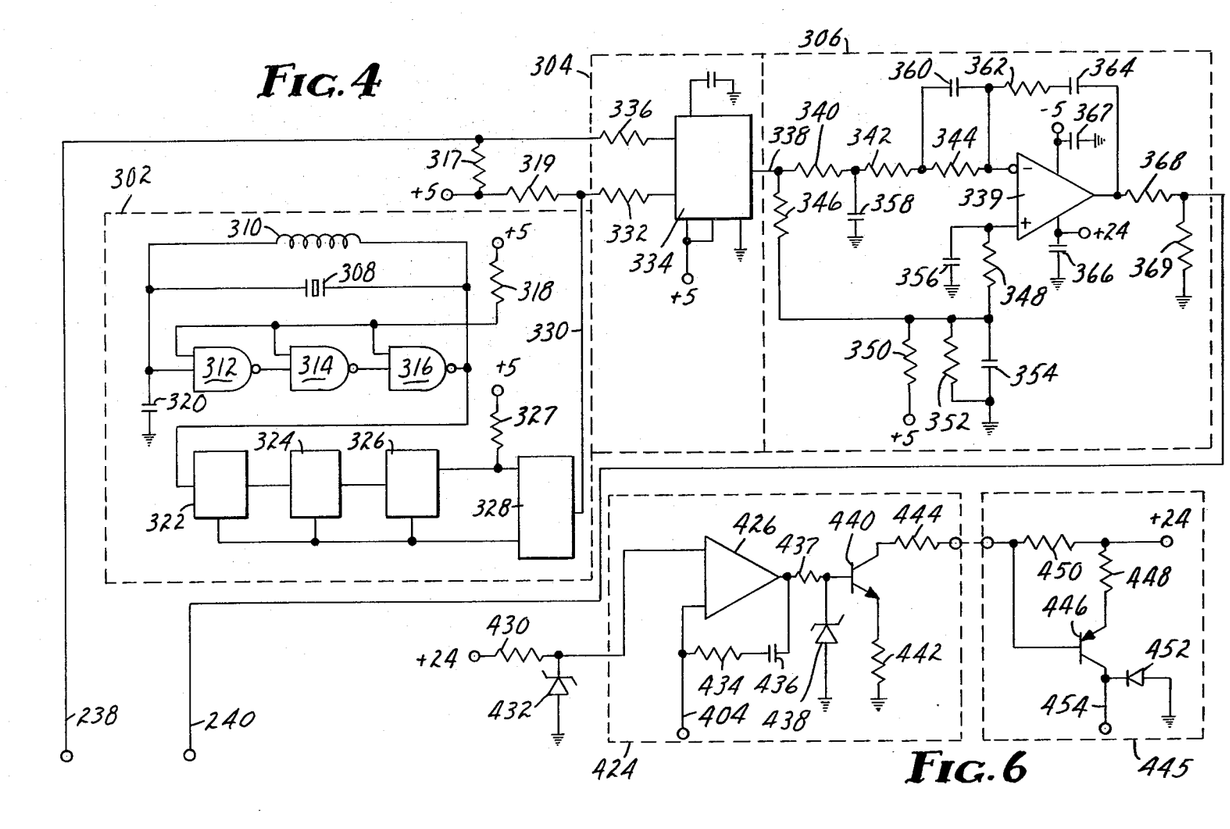
FIG. 4 is a schematic representation of a linear speed control feedback loop according to a preferred embodiment of the present invention.
FIG. 6 is a schematic representation of the remainder of the feedback loop set forth in FIG. 5.

In order to provide a signal indicative of the actual motor speed for use in the linear speed control feedback loop, shown in detail in FIG. 4, a signal from one of the sensors, such as that provided on lead 176, is processed in the operational amplifier 186 to provide the speed indicative signal on lead 238. An appropriately processed error signal indicative of the difference between a desired motor speed and the actual speed is then produced by the feedback loop of FIG. 4 on lead 240. This error signal is coupled through resistors 242, 244, and 246 and combined with the outputs of the respective operational amplifiers 181 and 182 and inverter stage 232 to provide the input to the respective sections 248, 250, and 252 of the filter network 230. The three filter sections are identical in construction and form a conventional two-pole low pass active filter. The operational amplifiers together with associated feedback resistor-capacitor networks provide an upper cutoff frequency of approximately 208 Hz. with 90 degrees of phase shift. A sensor output, such as that from comparator 181, on lead 254, together with the error signal through the resistor 242 is connected through resistors 256 and 258 and capacitor 260 to the non-inverting input of operational amplifier 262. In contrast, the inverting input to the operational amplifier is held at a fixed voltage via the voltage divider resistors 264 and 266. A portion of the output from the operational amplifier is fed back to the negative input via capacitor 268. The decoupling capacitors 270 and 272 are further provided in a conventional fashion. Finally, the output of the operational amplifier is coupled through an RC network, including resistor 274 and capacitor 276, to ultimately result in a motor control signal on lead 278. The filter network 248 thus transforms the substantially square wave input signal provided on lead 254, the amplitude of which is appropriately modified by the error signal on lead 240 into a substantially sinusoidal signal on lead 278. Furthermore, the sinusoidal signal is appropriately delayed in time due to the processing through the operational amplifier filter section.

The remaining filter sections 250 and 252 are, as noted above, identical to that of the section 248 and thus include operational amplifiers 280 and 282, respectively, together with like resistor and capacitor networks. The square wave input signals provided from the operational amplifier comparator 182 and the inverter 232 on leads 284 and 286, respectively, in substantially square wave form, are thus processed through the respective filter sections 250 and 252 to provide substantially sinusoidal motor drive signals on leads 288 and 290 for subsequent inputs to the driver amplifiers shown in detail in FIG. 5. Motor speed feedback signals indicative of the voltage applied to the respective motor windings are provided on leads 292, 294, and 296, respectively, which signals are coupled through resistor-capacitor networks, such as resistor 298 and capacitor 300, to further modify the amplitude of the output signals on the respective leads 278, 288, and 290.

The linear speed control feedback loop shown in FIG. 4, includes an oscillator section 302, a frequency/phase detector 304, and a servo loop compensator circuit 306. The crystal oscillator 302 supplies a series of pulses at a fixed predetermined frequency. In a preferred embodiment, a frequency of 208.3 Hz is utilized. This frequency is obtained by means of a crystal controlled oscillator including a crystal 308 having a natural resonant frequency of 14.933 MHz in parallel with an inductor 310. These components, together with NAND gates 312, 314, and 316 and resistor 318 and capacitor 320 provide periodic high frequency pulses which are coupled to a series of dividers 322, 324, 326 and 328, each of which divides the frequency of the input pulses by factors of 16, 16, 4, and 70, respectively, such that the output of the final divider 328 on lead 330 is a square wave having the desired 208 Hz frequency. The signals on lead 330 are fed into the frequency/phase detector 304 through resistor 332 to one input of the frequency/phase detector chip 334. The other input to the frequency/phase detector chip 334 comes from the output of comparator 186 in FIG. 3 on lead 238 through resistor 336 and thus provides an indication of the speed and phase position of the rotor.

The frequency/phase detector chip 334 supplies an average signal which is less than 2.5 volts on its ouput lead 338 when the frequency of the pulses from the crystal oscillator 302 are greater than the frequency of the speed/phase rotor position signals on lead 238. Alternatively, the frequency/phase detector chip 334 provides an average signal which is greater than 2.5 volts at its output 338 when the frequency of the signals from the crystal oscillator 302 are less than the frequency of the signal on lead 238. When the signals coming from the oscillator 302 and those from the comparator on lead 238 are equal in frequency, and if the positive edges of the signals from the crystal oscillator 302 leads the positive edge of the signals on lead 238, then the average signal present at the output of the frequency/phase detector chip 334 will be less than 2.5 volts, while the opposite will be true if the positive edges from the signals from the crystal oscillator 302 lag the positive edges from the signals on lead 238. Thus, the output of the frequency/phase detector chip 334 on lead 338 will be proportional to the difference between the frequency of the position signals coming from the motor and the frequency of the square waves coming from the crystal oscillator, and also proportional to the phase difference of those signals once the frequencies are equal.

This signal is then fed to the servo loop compensator circuit 306, namely, to the negative input of the operational amplifier 339 through series resistors 340, 342, and 344, and to the positive input of amplifier 339 through a compensation network formed of resistors 346, 348, 350 and 352 and capacitors 354 and 356. Resistors 350 and 352, along with capacitor 354 provide a voltage divider and filter to develop a 2.5 volt reference potential. This potential biases the phase detector output to +2.5 volts through resistor 346. The 2.5 volt bias is also supplied to the positive input of amplifier 339 through resistor 348. Therefore, as the phase angle between the input pulses varies, the phase detector provides positive and negative pulses, referenced to +2.5 volts, whose pulse widths are proportional to the phase difference. Resistors 340, 342, and capacitor 358 provide a low-pass filter for the signal, while resistor 344 and capacitor 360 provide a phase lead network for shaping servo loop response. Resistor 362 and capacitor 364 provide further shaping of the servo loop response. Capacitors 366 and 368 are used to filter and decouple the power supply for the operational amplifier 339. Resistors 368 and 369, on the output of operational amplifier 339, operate to attenuate the output thereof resulting in an error signal on lead 240, indicative of the integral of the velocity error of the rotor of the DC motor with respect to the square wave from the crystal oscillator. The error signal on lead 240 is then coupled back to the input of the filter sections as shown in FIG. 3.

Figure 5:
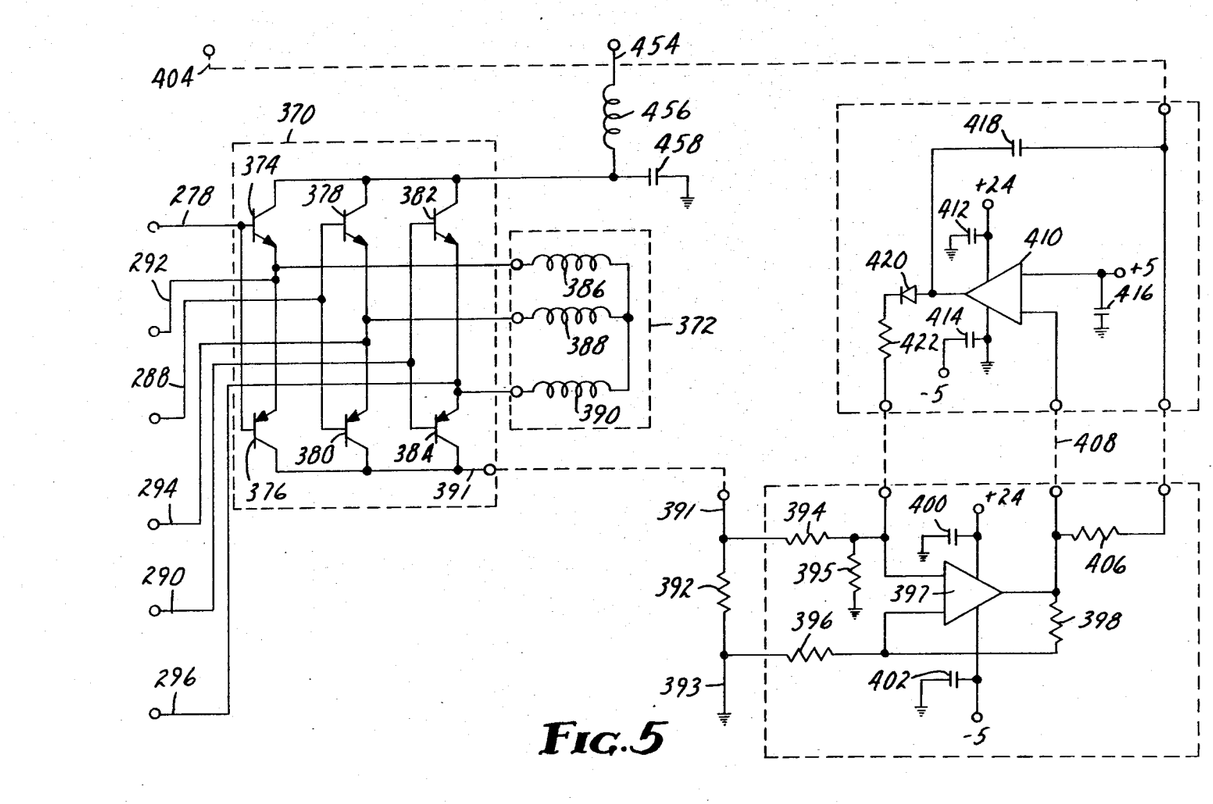
FIG. 5 is a schematic representation of the drive amplifier and motor windings of the present invention, together with a portion of a second feedback loop for controlling the motor current during start up operations.

FIG. 5 is a schematic representation of the driver amplifier 370 and the motor windings 372. Signals from the respective sections of the filter network 230 are there shown to be coupled on leads 278, 288, and 290, to three pairs of class B linear amplifiers, each of which contains a pair of transistors 374 and 376, 378 and 380, and 382 and 384, respectively. The common emitter-emitter connection between each pair is coupled to a respective motor winding 386, 388, or 390, as appropriate. As indicated in FIG. 5, the motor windings are connected in a three-phase "Y" configuration. It should readily be appreciated that other winding configurations as well as other phase motors may be similarly utilized according to the broad concepts of the present invention. Each of the amplifier sections is further provided with a feedback signal from the common emitters of the respective transistor pairs, which signals are fed back on leads 292, 294, and 296, to the respective filter sections 248, 250, and 252.

A further feedback loop is also preferably provided which responds to the total current drawn by all of the respective motor windings. The purpose of this loop is to limit average DC current in the driver transistors during startup. All of the motor winding current flows through the current sensing resistor 392. The resultant voltage is coupled through resistors 394, 395, and 396 to an operational amplifier 397. Resistor 398 provides negative feedback. Capacitors 400 and 402 decouple and filter the power connections. The output of the operational amplifier 397, operating as a differential amplifier, is then supplied to output 408.

The output from the operational amplifier 397 is also coupled to a positive feedback loop via lead 408 to the positive input of another operational amplifier 410. Capacitors 412 and 414 decouple the power connections to this operational amplifier. The negative input to operational amplifier 410 is coupled to a steady state plus five volts supply stabilized by a filter capacitor 416. The output of the operational amplifier 410 is coupled via capacitor 418 to operational amplifier 426, providing a voltage "spike" for rapid switching of amplifier 426. It also couples, via diode 420 and coupling resistor 422, back to the positive input of operational amplifier 397. In operation, the operational amplifier 410 provides a positive voltage input to operational amplifier 397 when its output exceeds 5 volts at the input to amplifier 410. When the output of operational amplifier 397 is less than approximately five volts, the output of the operational amplifier 410 is held to approximately minus three volts and has no affect on the input to amplifier 397. However, when the voltage at the output of operational amplifier 397 increases above the plus five volts threshold, the operational amplifier 410 switches toward plus twenty-four volts, diode 420 conducts, supplying this greater voltage back to the input of the operational amplifier 397, which in turn, increases the voltage of the output of operational amplifier 397, thus providing a positive feedback and accelerating the change in voltage present on output lead 408 as it passes through the plus five volt threshold point. This state exists until the current through resistor 392 decreases to a much lower level.

As is further shown in FIG. 6, the output feedback signal on lead 408 is coupled through resistor 406 to a comparator circuit 424 which comprises an operational amplifier 426, the negative terminal of which is coupled to the feedback signal on lead 404. The positive terminal is in turn coupled to a reference potential of six volts established via resistor 430 and zener diode 432. Resistor 434 and capacitor 436 compensate to ensure closed loop stability. Zener diode 438 operates in conjunction with transistor 440 to limit the maximum drive current which can be applied to transistor 446. Transistor 440, along with resistors 442 and 444, provides inversion, power gain and level shift to appropriately drive the switching circuit 445. Circuit 445 includes a transistor 446, bias resistors 448 and 450, and diode 452. The diode 452 conducts to discharge inductor 456 when transistor 446 switches off. The output of transistor 446 is coupled on lead 454 to a 250 microhenry inductor 456. Capacitor 458, diode 452 and inductor 456 serve to control transient voltages as transistor 446 switches on and off. The switched voltage is applied to the motor windings at startup. As the motor speed increases, its back EMF also increases, which causes current to decrease. At some lower current level, the output of operational amplifier 397 drops below 5 volts and causes operational amplifier 410 to switch to a low output. This condition propagates around the loop to make operational amplifier 426 go to a high positive output; transistor 442 is turned on, which in turn turns on transistor 446. This loop is, therefore, open when the motor is at the desired speed.

Table I contains a listing of component values as follows:

TABLE 1

| Reference Numeral | Component | Value or Type No. | Manufacturer |
|---|---|---|---|
| 86 | Opto-electronic sensor | 810 AM | Clairex Electronics |
| 88 | Opto-electronic sensor | 810 AM | Clairex Electronics |
| 90 | Opto-electronic sensor | 810 AM | Clairex Electronics |
| 92 | Opto-electronic sensor | 810 AM | Clairex Electronics |
| 140 | Resistor | 0.1 ohms 5 wt. | |
| 150 | Resistor | 4.7 K | |
| 152 | Zener Diode | 5.6V | |
| 162 | Opto-electronic sensor | 810 AM | Clairex Electronics |
| 164 | Opto-electronic sensor | 810 AM | Clairex Electronics |
| 166 | Opto-electronic sensor | 810 AM | Clairex Electronics |
| 168 | Opto-electronic sensor | 810 AM | Clairex Electronics |
| 170 | Multiplexer | 4053 | RCA Corp. |
| 178 | Resistor | 100 K | |
| 179 | Capacitor | 47 µf | |
| 181 | Comparator | LM 339 | National Semiconductor |
| 182 | Comparator | LM 339 | National Semiconductor |
| 184 | Comparator | LM 339 | National Semiconductor |
| 186 | Comparator | LM 339 | National Semiconductor |
| 188 | Resistor | 5.6 K | |
| 190 | Resistor | 5.6 K | |
| 192 | Resistor | 5.6 K | |
| 194 | Resistor | 5.6 K | |
| 196 | Resistor | 5.6 K | |

TABLE 1-continued

| Reference Numeral | Component | Value or Type No. | Manufacturer |
|---|---|---|---|
| 198 | Capacitor | .01 μf | |
| 200 | Resistor | 5.6 K | |
| 202 | Resistor | 5.6 K | |
| 204 | Resistor | 5.6 K | |
| 206 | Resistor | 100 K | |
| 208 | Capacitor | 470 pf | |
| 210 | Resistor | 100 K | |
| 212 | Capacitor | 470 pf | |
| 214 | Resistor | 100 K | |
| 216 | Capacitor | 470 pf | |
| 218 | Resistor | 100 K | |
| 220 | Capacitor | 470 pf | |
| 222 | Capacitor | .01 μf | |
| 224 | Capacitor | .01 μf | |
| 226 | Capacitor | .01 μf | |
| 228 | Capacitor | .01 μf | |
| 234 | Transistor | 2N2222 | |
| 236 | Resistor | 5.6 K | |
| 242 | Resistor | 5.6 K | |
| 244 | Resistor | 5.6 K | |
| 246 | Resistor | 5.6 K | |
| 256 | Resistor | 1.5 M | |
| 258 | Resistor | 0.75 M | |
| 260 | Capacitor | 1000 pf | |
| 262 | Operational Amplifier | LM 353 | National Semiconductor |
| 264 | Resistor | 200 K | |
| 266 | Resistor | 180 pf | |
| 268 | Capacitor | 180 pf | |
| 270 | Capacitor | .01 μf | |
| 272 | Capacitor | .01 μf | |
| 274 | Resistor | 100 ohm | |
| 276 | Capacitor | .01 μf | |
| 280 | Operational Amplifier | LM 353 | National Semiconductor |
| 282 | Operational Amplifier | LM 353 | National Semiconductor |
| 298 | Resistor | 100 K | |
| 300 | Capacitor | 510 pf | |
| 308 | Crystal | 14.933 MHz | CTS Corp. |
| 310 | Inductor | 6.3 μHy | Nytronics, Inc. |
| 312 | NAND gate | 7400 LS | |
| 314 | NAND gate | 7400 LS | |
| 316 | NAND gate | 7400 LS | |
| 317 | Resistor | 6.7 K | |
| 318 | Resistor | 4.7 K | |
| 319 | Resistor | 220 ohms | |
| 320 | Capacitor | 10 pf | |
| 322 | Counter | 74LS393 | Texas Instruments Inc. |
| 324 | Counter | 74LS393 | Texas Instruments Inc. |
| 326 | Counter | 74LS393 | Texas Instruments Inc. |
| 327 | Resistor | 10 K | |
| 328 | Counter | 40105 B | RCA Corp. |
| 332 | Resistor | 10 K | |
| 334 | Frequency/Phase Detector | 4046 | Motorola Inc. |
| 336 | Resistor | 10 K | |
| 339 | Operational Amplifier | LM 353 | National Semiconductor |
| 340 | Resistor | 51 K | |
| 342 | Resistor | 51 K | |
| 344 | Resistor | 1 M | |
| 346 | Resistor | 10 K | |
| 348 | Resistor | 1 M | |
| 350 | Resistor | 220 ohms | |
| 352 | Resistor | 220 ohms | |
| 354 | Capacitor | .01 μf | |
| 356 | Capacitor | 0.1 μf | |
| 358 | Capacitor | 0.47 μf | |
| 360 | Capacitor | 0.22 μf | |
| 362 | Resistor | 6.2 M | |
| 364 | Capacitor | 1.0 μf | |
| 366 | Capacitor | .01 μf | |
| 367 | Capacitor | .01 μf | |
| 368 | Resistor | 270 ohms | |
| 369 | Resistor | 1.5 K | |

TABLE 1-continued

| Reference Numeral | Component | Value or Type No. | Manufacturer |
|---|---|---|---|
| 374 | npn Transistor | TIP 120 | Texas Instruments Inc. |
| 376 | pnp Transistor | TIP 125 | Texas Instruments Inc. |
| 378 | npn Transistor | TIP 120 | Texas Instruments Inc. |
| 380 | pnp Transistor | TIP 125 | Texas Instruments Inc. |
| 382 | npn Transistor | TIP 120 | Texas Instruments Inc. |
| 384 | pnp Transistor | TIP 125 | Texas Instruments Inc. |
| 392 | Resistor | 0.1 ohms 3 wt. | |
| 394 | Resistor | 1 K | |
| 395 | Resistor | 10 K | |
| 396 | Resistor | 1 K | |
| 397 | Operational Amplifier | LM 353 | National Semiconductor |
| 398 | Resistor | 10 K | |
| 400 | Capacitor | 0.01 μf | |
| 402 | Capacitor | 0.01 μf | |
| 406 | Resistor | 20 K | |
| 410 | Operational Amplifier | LM 353 | |
| 412 | Capacitor | .01 μf | |
| 414 | Capacitor | .01 μf | |
| 416 | Capacitor | .01 μf | |
| 418 | Capacitor | 220 pf | |
| 420 | diode | IN914 | |
| 422 | Resistor | 110 K | |
| 426 | Operational Amplifier | LM 353 | National Semiconductor |
| 430 | Resistor | 4.7 K | |
| 432 | Zener diode | 5.6 V | |
| 434 | Resistor | 6.8 K | |
| 436 | Capacitor | 680 pf | |
| 437 | Resistor | 100 ohm | |
| 438 | Zener diode | 1 N 5248B (18 V) | |
| 440 | Transistor | 2N 2222 | Motorola Inc. |
| 442 | Resistor | 2.7 K | |
| 444 | Resistor | 330 ohm | |
| 446 | pnp Transistor | TIP 125 | |
| 448 | Resistor | 0.1 ohm 3 wt. | |
| 450 | Resistor | 1 K | |
| 452 | diode | MR 910 | Motorola Inc. |
| 456 | Inductor | 250 μHy | Caddell-Burns Inc. |
| 458 | Capacitor | 4.7 μf | |

Thus, it can be seen that there has been shown and described a novel control system for a brushless DC motor. It is to be understood however that various changes, modifications, and substitutions in the form of the invention as well as in various details of the invention can be made by those skilled in the art without departing from the scope of the invention as defined by the following claims.

I claim:

1. A motor control system adapted to control a brushless direct current motor of the type having a rotor having a plurality of permanent magnet poles at equal angular locations about the axis thereof, the angular spacing therebetween being 360°/N where N is the number of poles, and a stator having at least three windings for providing at least three fields per pole comprising (a) means for sensing the position of the rotor relative to the stator, including a multisector marking means secured to said rotor for identifying each pole and at least four sensors positioned proximate to said marking means for detecting said sectors of the marking means and, being angularly spaced from each other to provide at least three sequential signals indicative of the incremental passage of a pole through an angular segment corresponding to said angular spacing, each sensor providing a square wave output signal, each transition of which denotes the passage of one pole past that sensor, (b) multiplex means for alternately selecting and passing therethrough output signals from a first or second group of said sensors, the first group including a succession of at least three equally angularly spaced sensors, and the second group including a similar succession of at least three equally angularly spaced sensors including the second and third sensor of said first group, whereby switching from the first to the second group enables the processing of square wave output signals indicative of a set of incremental positions of the rotor advanced in time over that provided by said first group to offset subsequent electrical time delays, (c) filter means including at least three independent filter sections, each filter section being coupled to process signals corresponding to a given sensor output passed through said multiplex means, and having a limited upper frequency cutoff to provide, in response thereto, time delayed motor control signals having an essentially sinusoidal waveform, (d) driver amplifier means including at least three linear amplifiers, each of which is coupled to one of said filter sections for amplifying one of said motor control signals and is further coupled between a direct current power source and a selected winding, for sequentially energizing said windings to provide a succession of fields corresponding to the incremental passage of a pole through said angular segment, and (e) negative feedback means including at least three separate feedback loops between each of said linear amplifiers and an associated filter section for responding to the current supplied to each of said windings to thereby control the intensity of each of said motor control signals such as to maintain said supplied current at a relatively constant level, whereby improved control over motor speed is effected, the substantially sinusoidal drive through said linear amplifiers markedly reducing motor noise and incremental speed variations.

2. A motor control system according to claim 1, further comprising
(f) oscillator means for establishing a motor speed reference signal having a predetermined pulse rate corresponding to a desired motor speed,
(g) frequency and phase detector means responsive to said predetermined pulse rate and to the transition rate of the selected output signal from one of said sensors to provide a speed and phase error signal indicative of the difference between the actual motor speed and phase and the desired motor speed and phase as indicated by the differences in the frequency and phase of the respective rates, and
(h) means responsive to said error signal for modifying said signals passed through said multiplex means to said filter means, thus increasing or decreasing the motor speed to minimize said error signal.

3. A motor control system according to claim 2, further comprising means for providing a reference signal representative of a valid output from a said sensor and comparator means including at least three comparators for individually comparing signals passed through said multiplex means and representing the outputs of selected sensors with said reference signal for providing square wave output signals having a standardized amplitude, such that the signals coupled to said filter means are modified solely by said error signals and are independent of variations in the amplitude of the sensor outputs.

4. A motor control system according to claim 1, further comprising means for inverting the output from at least one of said sensors to thereby shift the phase of at least one of said sensors and thus also shift the corresponding motor control signal by 180 degrees.

5. A motor control system according to claim 1, wherein said multiplex means further includes a timing circuit activated upon initial start up of said motor for controlling the switching from the first to the second group of sensors after a predetermined time after start up, at which time the motor speed will be at or near a desired operating speed.

6. A motor control system according to claim 1, wherein said driver amplifier means includes a set of three class B push-pull amplifiers for causing a substantially sinusoidal variation in the current sequentially applied to said windings.

* * * * *